United States Patent [19]

Leiter

[11] 4,175,785
[45] Nov. 27, 1979

[54] MOTOR VEHICLE ROOF

[75] Inventor: Robert Leiter, Krailling, Fed. Rep. of Germany

[73] Assignee: Webasto-Werk W. Baier GmbH & Co., Fed. Rep. of Germany

[21] Appl. No.: 821,236

[22] Filed: Aug. 2, 1977

[30] Foreign Application Priority Data

Aug. 21, 1976 [DE] Fed. Rep. of Germany ....... 2637839

[51] Int. Cl.² .............................................. B60J 7/04
[52] U.S. Cl. .................................................. 296/137 E
[58] Field of Search ........... 296/137 A, 137 B, 137 G, 296/137 F, 137 E

[56] References Cited

U.S. PATENT DOCUMENTS

| 3,414,320 | 12/1968 | Heim | 296/137 E |
| 3,580,629 | 5/1971 | Heim | 296/137 E |

Primary Examiner—Joseph F. Peters, Jr.
Assistant Examiner—Norman L. Stack, Jr.
Attorney, Agent, or Firm—Craig and Antonelli

[57] ABSTRACT

A movable cover for a roof opening in the passenger space of a motor vehicle is provided. The cover includes a rigid outer cover part which is configured so as to be in a flush position with adjacent vehicle body panel structure when the opening is closed, as well as a headlining spaced from the fixed cover part and facing inwardly into the passenger space. In order to assure a reliable, attractive, cooperation of the headlining with the adjacent interior structure of the vehicle passenger space, the cover part and the headlining are connected by way of leaf springs or the like which place a slight pressure on the headlining in a direction away from the cover part so as to press the headlining against upwardly facing fixed vehicle frame parts at the roof opening.

14 Claims, 4 Drawing Figures

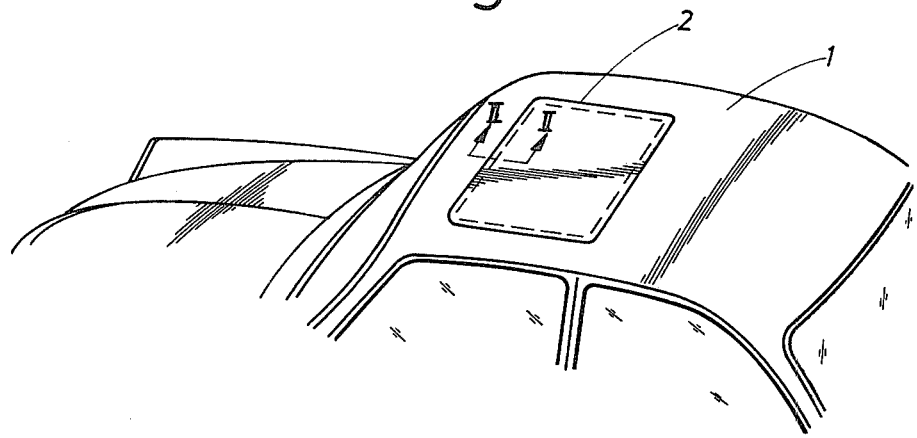
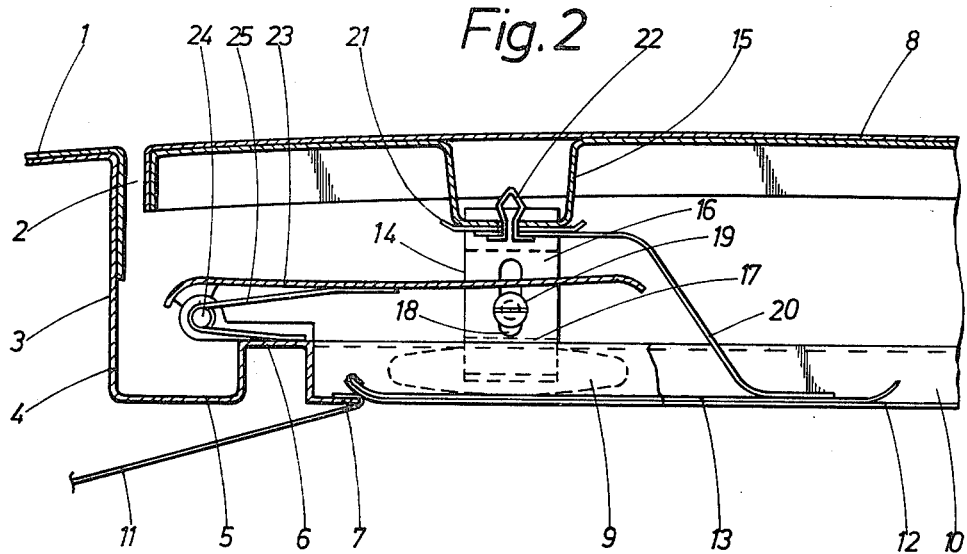

MOTOR VEHICLE ROOF

BACKGROUND AND SUMMARY OF THE INVENTION

The present invention relates to a vehicle panel arrangement, such as a motor vehicle roof with a roof opening, closable by a rigid, displaceable, and preferably also tiltable cover, to whose under side a headlining is mounted in the vicinity of its leading edge, said headlining consisting of a fabric-covered frame or a plate, and the edges of said headlining being covered by a frame part surrounding the roof opening from above when the cover is closed.

In known motor vehicle roofs of this type, the headlining is connected directly and rigidly to the cover. Because of the practical necessity to provide height adjustment of the cover, practically always required for reasons of tolerance, in such manner that the upper surface of said cover is exactly flush with the fixed part of the roof when the cover is closed, it can happen that the headlining either does not fit against the frame part surrounding the roof cutout, which is visually unattractive, or the headlining rests against the frame part under excessive pressure, which can lead to bulges and folds.

An object of the invention is to provide a motor vehicle roof in which a gentle pressure of the headlining against the frame surrounding the roof opening is always ensured independently of the height adjustment of the cover.

This object is achieved according to the invention by virtue of the fact that the headlining is connected to the cover by spring means, said spring means pressing the headlining against the upper surface of the frame part running along the leading edge of the roof opening when the sliding cover is closed.

The spring means in a preferred embodiment consists of leaf springs, mounted at one end on the forward part of the frame of the headlining or the plate forming the headlining, and at the other end against a track, said track being connected by clips to a cross strut on the under side of the sliding cover. Assembly of the headlining is therefore no more difficult than the assembly of the previously known headlining which was rigidly connected to the cover. Instead of individual leaf springs, a flexible shaped panel or plastic part can be used, extending over the entire width of the cover, according to other preferred embodiments of the invention. If desirable, a part of this type can simultaneously form the forward part of the frame of the headlining. This type of part which extends over the entire width of the cover avoids production of wind noise, which can develop when individual leaf springs are used. Preferably, the spring means, i.e., the leaf springs or the flexible shaped panel or plastic part, extend backward from their point of attachment to the sliding cover. This makes it possible to displace the cross struts on the sliding cover, to which the headlining is attached, considerably forward in the vicinity of the leading edge of the cover, so that the guide shoes of the cover, which normally rest against this cross strut, are located far forward. This is advantageous in sliding covers whose rear edge can be tilted above the roof plane, since in this case the leading edge is not lowered so far during tilting or, with the forward edge tilted to the same extent, the degree to which the rear edge of the cover is tilted can be increased.

By extending the spring means from their fastening point on the sliding cover rearward, a space is created delimited by the sliding cover, headlining, and spring means, said space advantageously being used for receiving a wind deflector, said deflector being swivelable about an axis at right angles to the longitudinal axis of the vehicle in the forward area of the roof opening.

These and further objects, features and advantages of the present invention will become more obvious from the following description when taken in connection with the accompanying drawings which show, for purposes of illustration only, a single embodiment in accordance with the present invention; and wherein

BRIEF DESCRIPTION OF THE DRAWINGS

FIG. 1 is a schematic perspective view of a motor vehicle roof with a roof opening and movable panel for closing same, constructed according to the present invention;

FIG. 2 is a cross-sectional view along line II-II in FIG. 1.

DETAILED DESCRIPTION OF THE DRAWINGS

Figure 3:
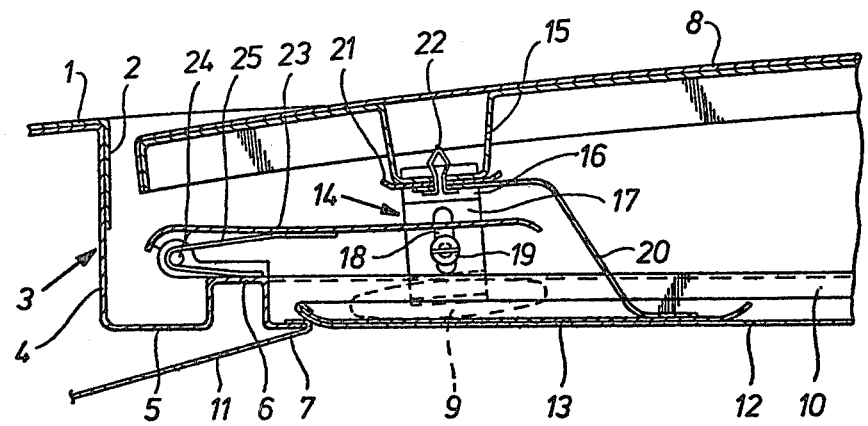
FIG. 3 is a cross-sectional view as in FIG. 2, but showing the roof in a tilted open position.
Figure 4:
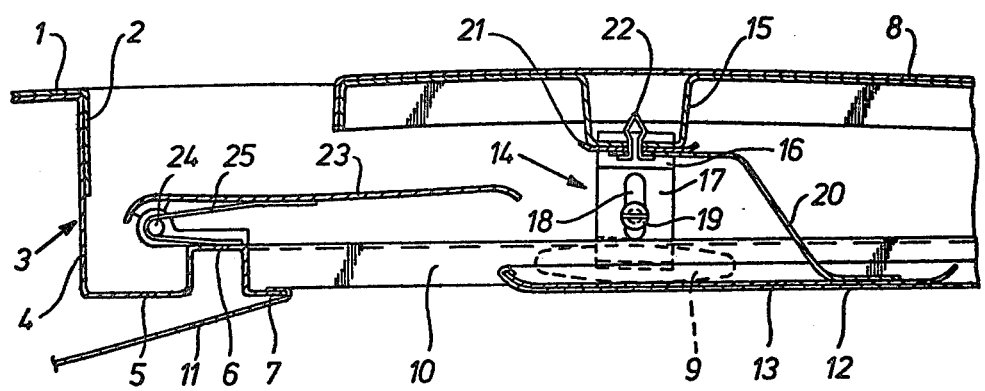
FIG. 4 is a cross-sectional view as in FIG. 2, but showing the roof in a slid-back open position.

The motor vehicle roof 1 shown in FIG. 1 has a roof opening 2, surrounded at least at the front and laterally by a roof frame 3. Roof frame 3 comprises a vertical wall 4, a horizontal wall 5, and a section 6 which is U-shaped in cross section, and terminates in a horizontal flange 7. Roof opening 2 is closable by a rigid cover 8, said cover being slidable rearward beneath solid roof 1 to open roof opening 2 as shown in FIG. 4, or, alternatively, being tiltable as shown in FIG. 3, so that its rearward edge projects above the plane of roof 1. For this purpose, cover 8 is provided on both sides in the vicinity of its leading edge with guide shoes 9, said shoes being guided in corresponding tracks 10 in the side walls of roof frame 3. Guide shoes 9, as is evident from the drawing, are made convex and allow limited swiveling movement of cover 8 about an axis running through the two guide shoes 9, at right angles to the longitudinal plane of the vehicle.

In order to offer the vehicle passengers an attractive view, a fixed headlining 11 is provided, fitted around flange 7 of roof frame 3, as well as a headlining 12 movable with sliding cover 8. Headlining 12, in the embodiment shown, consists of a material stretched on a frame, of which only the leading frame part 13 is visible in FIG. 2. Alternatively, headlining 12 can consist of a plate according to other non-illustrated embodiments of the invention.

In order to achieve a proper fit of movable headlining 12 against fixed headlining 11 with cover 8 closed, it is necessary for movable headlining 12 to rest on flange 7 along the leading edge and the side edges of roof frame 3. This would not be provided in a headlining 12 which was rigidly connected to cover 8, since cover 8, in order to be able to be exactly flush with fixed roof part 1 in its closed position, must be height adjustable. For this purpose, guide shoe 9 is normally connected to cover 8 by a two-part, length-adjustable support 14. In the embodiment shown, support 14 consists of a bracket 16 mounted on one cross strut of cover 8 and a bracket 17 supporting the guide shoe, one part of which bracket is provided with a slot 18, and the other part accepts a bolt 19 passed through this slot. In order to ensure that movable headlining 12 rests upon flange 7 with light pressure despite the height adjustment of cover 8, movable headlining 12 is connected to cover 8 by leaf springs 20, said springs being fastened at one end to a track 21 extending over the width of roof opening 2 and at the other end to the forward part 13 of the headlining frame. Track 21 is fastened in known fashion by spring clips 22 to the under side of cross strut 15. Leaf springs 20 tend to press headlining frame 13 into constant contact with the upper surface of frame flange 7. Instead of individual leaf springs 20, a spring strip extending over the entire width of roof opening 2 can be provided, said strip having the same cross-sectional shape as the leaf springs 20 shown in FIG. 2 according to other contemplated embodiments of the invention.

Leaf springs 20, as shown in FIG. 2, extend from their point of attachment on cross strut 15 on cover 8 backward to their fastening point on headlining frame 13. This creates a space between movable headlining 12, cover 8, and leaf springs 20, said space being usable to store a wind deflector 23 when cover 8 is closed. Wind deflector 23 is swivelable in the usual fashion about an axis 24 at right angles to the longitudinal axis of the vehicle. The tilting movement of wind deflector 23 with sliding cover 8 retracted is executed with the aid of a spring 25, while the tilting of wind deflector 23 is accomplished by a device not shown when cover 8 is slid forward to close roof opening 2.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

Movable panel vehicle roof opening structures to which the present invention may be applicable are disclosed for instance in U.S. Pat. Nos. 3,572,822, 3,789,645, 3,976,325 and 4,023,858.

I claim:

1. Movable vehicle panel apparatus including a vehicle panel which is movable to and from a closed position closing an opening in a vehicle body portion defining a passenger space, said panel comprising:
   a cover part which faces away from the interior of the vehicle passenger space when said panel member is in said closed position,
   a headlining spaced from said cover part and disposed to face the interior of the vehicle passenger space when said panel member is in said closed position,
   and resilient leaf spring means attached to and between the cover part and headlining for interconnecting said cover part and said headlining in such a manner as to resiliently movably support said headlining means with respect to said cover part, and so as to resiliently push said headliner against a surrounding relatively fixed vehicle frame part when said panel member is in said closed position, the attachment of said leaf spring means to the cover part being forward of its attachment to the headlining in the closing direction of movement.

2. Apparatus according to claim 1, wherein said panel is a cover for a roof opening in a passenger motor vehicle, said cover part being a rigid part alignable with the outer contours of the vehicle body when said cover is in its closed position, wherein said headlining consists of one of a fabric covered frame and a plate, said headlining exhibiting a visually attractive surface facing the passenger space when said cover is in its closed position.

3. Apparatus according to claim 2, wherein roof frame structure surrounds said roof opening, said frame structure constituting said fixed vehicle frame part and covering portions of said cover from below when said cover is in its closed position.

4. Apparatus according to claim 3, wherein said headlining is attached to said cover part by said resilient means in the area adjacent the leading edge of the cover, said resilient means pressing the headlining against the upper surface of said roof frame structure surrounding said opening.

5. Apparatus according to claim 2, comprising a track, said track being attached by clips to a cross strut on the under side of the cover part, the attachment of the leaf spring means to said cover part being at said track.

6. Apparatus according to claim 2, wherein said resilient leaf spring means includes a flexible track, said flexible track extending over the entire width of the cover and being fastened along one longitudinal edge to the cover part and along the other longitudinal edge to the headlining.

7. Apparatus according to claim 2, wherein said resilient means are spring means extending backward from a fastening point on the cover part.

8. Apparatus according to claim 5, wherein said spring means extend backward from a fastening point on the cover part.

9. Apparatus according to claim 6, wherein said spring means extend backward from a fastening point on the cover part.

10. Apparatus according to claim 7, wherein the space delimited by the cover, the headlining, and the spring means is configured and disposed to accommodate a wind deflector, said wind deflector being swivelable in the forward area of the roof opening about an axis located at right angles to the longitudinal axis of the vehicle.

11. Apparatus according to claim 8, wherein the space delimited by the cover, the headlining, and the spring means is configured and disposed to accommodate a wind deflector, said wind deflector being swivelable in the forward area of the roof opening about an axis located at right angles to the longitudinal axis of the vehicle.

12. Apparatus according to claim 9, wherein the space delimited by the cover, the headlining, and the spring means is configured and disposed to accommodate a wind deflector, said wind deflector being swivelable in the forward area of the roof opening about an axis located at right angles to the longitudinal axis of the vehicle.

13. Apparatus according to claim 2, wherein said cover is slidably and tiltably movable into and out of said closed position.

14. Apparatus according to claim 2, wherein adjusting means are provided for adjusting the height of the cover part with respect to the supporting structure accommodating movement of the cover into and out of its closed position.

* * * * *